United States Patent
Ou et al.

(10) Patent No.: US 7,156,313 B2
(45) Date of Patent: Jan. 2, 2007

(54) IC CARD WITH DISPLAY PANEL BUT WITHOUT BATTERIES

(75) Inventors: Chi-Yuan Ou, Taipei (TW); Lee-Chung Lin, Taipei Hsien (TW)

(73) Assignee: Smart Displayer Technology Co., Ltd., Taipei Hsien (TW)

( * ) Notice: Subject to any disclaimer, the term of this patent is extended or adjusted under 35 U.S.C. 154(b) by 46 days.

(21) Appl. No.: 10/928,164

(22) Filed: Aug. 30, 2004

(65) Prior Publication Data

US 2006/0049263 A1    Mar. 9, 2006

(51) Int. Cl.
*G06K 19/06* (2006.01)
(52) U.S. Cl. ..................................... 235/492
(58) Field of Classification Search ............. 235/492
See application file for complete search history.

(56) References Cited

U.S. PATENT DOCUMENTS 6,234,902 B1 *    5/2001    Hazama .................... 463/43

2002/0107054 A1 *    8/2002    Fujisawa et al. ............ 455/573
2005/0240778 A1 *    10/2005    Saito ........................ 713/186

\* cited by examiner

*Primary Examiner*—Daniel Stcyr
(74) *Attorney, Agent, or Firm*—Bacon & Thomas, PLLC

(57) ABSTRACT

An IC card with a display panel but without batteries includes a contact/contactless communication interface, a microprocessor, an EEPROM, a rectifier/voltage regulator, a display driver, a charge-pump (26) disposed therein, and a display panel disposed thereon. The microprocessor receives the external data, and displays the data on the display panel so that users can look up the external data. The display panel exhibits a double steady-state function having the characteristic that once the data are displayed, no persistent power supply for the display panel is needed, and thus the displayed data will be preserved persistently until the next time the data are updated. In this way, users are not required to use batteries and can avoid being disturbed by the service life of the batteries.

8 Claims, 2 Drawing Sheets

IC CARD WITH DISPLAY PANEL BUT WITHOUT BATTERIES

FIELD OF THE INVENTION

The invention relates to "an IC card with display panel but without batteries" wherein the display panel possesses a bistable function, and the internal power source is supplied by a communication interface that can be of a contactless type RF interface or a contact-type communication interface.

BACKGROUND OF THE INVENTION

Owing to the progress in technology, IC cards, such as credit card, fiscard, telephone card, bus card, rapid transit card, and saving card etc. have replaced many of the transaction and disbursement. According to the communication interface, the IC card can be classified into the following types:
1. Contact-type Interface: it divides further into a Smart Card and a Memory Card.
    Smart Card: having function of control mechanism and including a microprocessor. It can have the one with 8-bit, 16-bit, or 32-bit and have the addition of confidential treatment such as DES, RSA etc.
    Memory Card: including memory, simple logic circuit wherein the memory is ROM (read-only memory) or EEPROM (electrically erasable programmable read only memory); the capacity of the memory can be of 4K, 8K, - - - 1M bytes etc.
2. Contactless type Interface: it further divides into an A-type, a B-type, and a Felica-type wherein both the A-type and B-type are in Proximity ISO 14443 standard while the Felica-type belongs to Sony's standard; among them the communication distance are all around 0~10 cm (centimeter).
3. Combo type: a card combining both the Contact-type Interface and the Contactless type Interface. It normally divides into two types, i.e. a single-chip type and a multi-chip type.

Although the above-mentioned various kinds of IC-card normally have other devices added such as magnetic stripe, magnetic code, optical memory etc. to increase or enlarge their application or range of use, the user cannot read and look up its content without carrying the card along to the card reader. In other word, one cannot make use of the function for looking up the content of the IC card whenever there is no card reader available or no monitor connected. What is more, IC cards having different applications cannot integrate as one card. Consequently, the users need to carry along many different cards having different functions or applications. As a result, besides being inconvenient, it increases the cost for issuing IC cards too.

In view of the above-mentioned disadvantages, the inventor of the invention used to file a patent application in U.S.A. and granted the patent as U.S. Pat. No. 6,561,430 B2, Chi-Yuan Ou, May 13, 2003, titled as "IC card with display screen". In this prior art, an IC card includes circuits such as a microprocessor, an EEPROM, and a card reader interface etc. The surface of the IC card also provides display screen (11), solar battery (12), and contact switches (13), (14). The card reader interface, after receiving the data in the card reader, can perform the decoding, decrypting, and categorizing functions. Afterward, the data are stored in EEPROM to attain the object of data storing. When it comes to use, the user hitches the contact switches to display the data content on the display screen in Chinese or English. In this way, the user can look up the data and their content stored without the necessity of carrying the IC cards to the card reader. However, in the IC card of this prior art, the required power supply for driving the relevant devices makes use of the solar batteries disposing on the surface of the IC card, and/or rechargeable battery to serve as back-up power source. Again, the user makes use of the contact switches to read data to manifest the advantage of this granted patent of the prior art. However, it is found that the fabrication process of this granted patent of the prior art is relatively tedious. What is more, the fabrication cost of the solar battery, rechargeable battery, and the contact switches contributes a large proportion of the total cost. Therefore, the inventor, after evaluating the factors on how to shorten the fabrication process and lower the cost, presents the "IC card with display panel but without batteries" of the invention that not only can provide the functions of displaying and looking up but also can lower the cost further.

SUMMARY OF THE INVENTION

In light of the disadvantages of the prior arts, the invention provides an "IC card with display panel but without batteries" that aims to ameliorate at least some of the disadvantages of the prior art or to provide a useful alternative.

In accordance with the invention, the IC card of the invention can provide the display and read functions that are able to exempt using batteries to avoid being disturbed by the service life of the batteries.

Therefore, in order to compensate the above-mentioned imperfection of the prior art, one of the objectives of the invention is to provide an "IC card with display panel but without batteries" that includes a communication interface, a microprocessor, an EEPROM, a rectifier/voltage regulator, a display driver, and a charge-pump disposed therein, as well as a display panel disposed thereon.

It is another objective of the invention to provide a microprocessor, that after receiving the external data, can read the data through the microprocessor and displays them on the display panel for the users to look up the external data.

It is a further objective of the invention to provide a display panel with bistable function that has the characteristic such that once the data are displayed, no persistent power supply for the display panel is needed, thus the displayed data will be preserved persistently until the next time when data are updated.

It is a further objective of the invention to provide a communication interface that can be either a contactless type RF interface or a contact-type communication interface wherein the internal working voltage can be supplied by making use of the RF interface circuit to receive the RF signals to generate direct current source through rectification and voltage regulation.

It is a further objective of the invention wherein the driving power source required therein can be a contactless type communication interface or a contact-type communication interface depending on the option of pattern. One can obtain the power source by making use of the following methods:
1. Contactless type communication interface that has an antenna provided inside the IC of the contactless type RF interface to perform RF decryption through a communication interface for the RF signals and coupling signals received from an external card reader. On the other hand, the coupling signal generates direct current to supply the internally required voltage through a rectifier/voltage regulator.

2. Contact-type communication interface that has the IC of a contact-type IC card perform decryption to be read in by the microprocessor after the communication interface has received the digital series signals of the external card reader. In the mean time, the external card reader also supplies direct current for internal usage through the contact-type interface.

It is a further objective of the invention, wherein the power source signals of the contact-type communication interface can provide a power source too.

It is a further objective of the invention, wherein the users can exempt using batteries that can avoid being disturbed by the service life of the batteries.

To achieve the above-mentioned objectives, an "IC card with display panel but without batteries" includes a communication interface, a microprocessor, an EEPROM, a rectifier/voltage regulator, a display driver, and a charge-pump disposed therein, as well as a display panel disposed thereon. The microprocessor, after receiving the external data, reads the data through the microprocessor and displays them on the display panel for the users to look up the external data. The display panel is the one with bistable function having the characteristic that once the data are displayed, no persistent power supply for the display panel is needed, thus the displayed data will be preserved persistently until the next time when data are updated. The communication interface can be either a contactless type RF (radio frequency) interface or a contact-type communication interface. The internal working voltage can be supplied by making use of the RF interface circuit to receive the RF signals to generate direct current source through rectification and voltage regulation. The power source signals of the contact-type communication interface can provide the power source too. In this way, the users can exempt using batteries that can avoid being disturbed by the service life of the batteries.

Detailed description as well as the content of the techniques that relate to the invention accompanied by the drawings is described in the following:

DETAILED DESCRIPTION OF THE EMBODIMENTS

Figure 1:
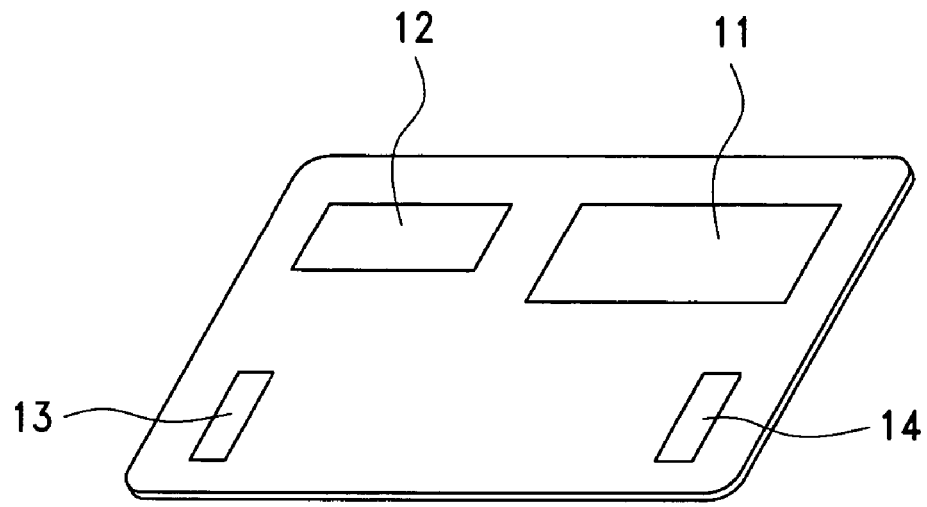
FIG. 1 is a schematic isometric view of an outward appearance of the prior art.
Figure 2:
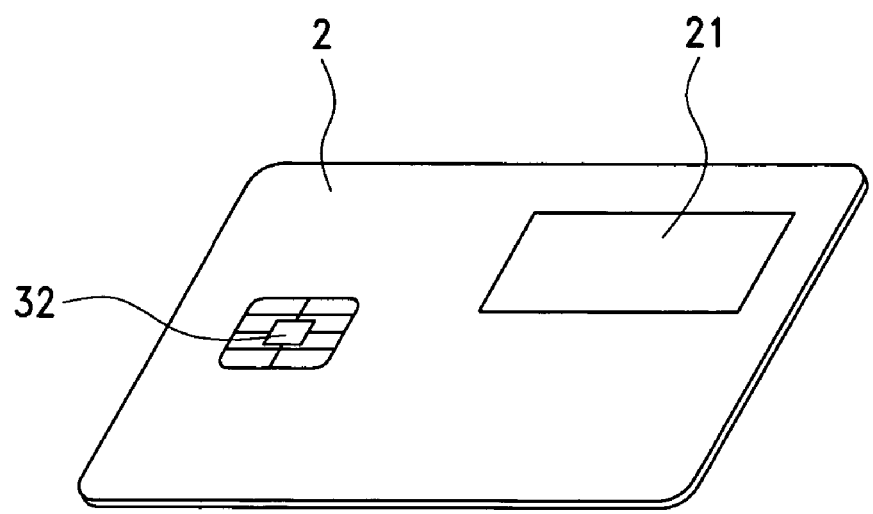
FIG. 2 is a schematic isometric view of an outward appearance of the invention.

FIG. 2 is a schematic isometric view of an outward appearance of the invention. As shown in FIG. 2, the IC card with display panel but without batteries of the invention includes an IC card body (2) having a display panel (21) and an IC (32) (shown in FIG. 2 is a Contact Smart IC) provided thereon. The IC card with display panel but without batteries of the invention can display the data on the display panel (21) for users to look up the stored data and the content by making use of the following working flow chart.

Figure 3:
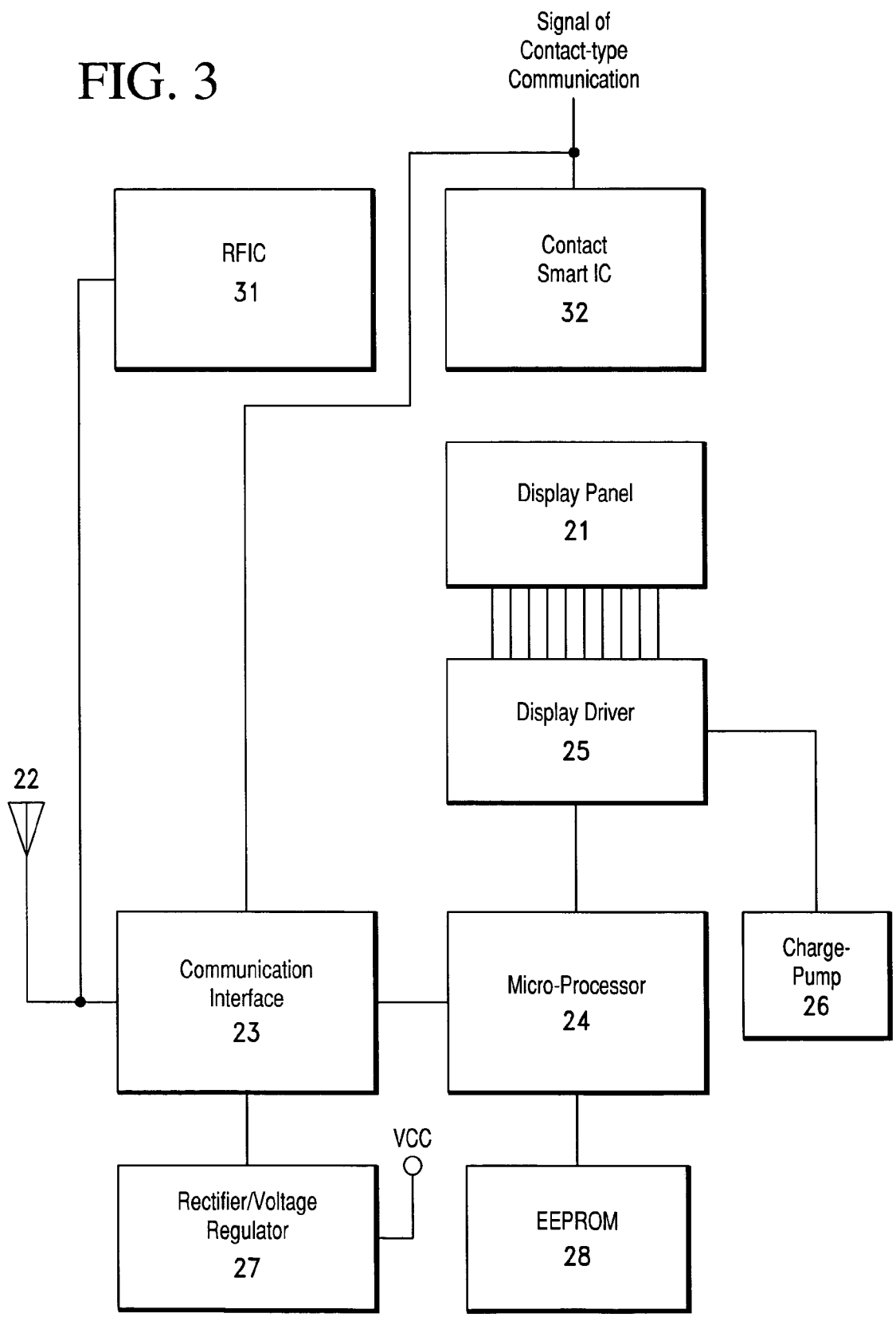
FIG. 3 is a block diagram of the circuit design of the invention.

FIG. 3 is a block diagram of the circuit design of the invention. As shown in FIG. 3, the communication interface can be either a contactless type RF (radio frequency) interface or a contact-type communication interface, and the driving power source required therein can be a contactless type communication interface or a contact-type communication interface depending on the option of pattern. One can obtain the power source by making use of the following methods:

1. Contactless Type Communication Interface:

Non-contact type communication interface has an antenna (22) provided inside the IC of the contactless type RF interface to perform RF decryption through a communication interface (23) for the RF signals and coupling signals received from an external card reader. On the other hand, the coupling signal generates direct current to supply the internally required voltage through a rectifier/voltage regulator (27).

2. Contact-Type Communication Interface:

The contact-type communication interface has the IC (32) of a contact-type IC card perform decryption to be read in by the microprocessor (24) after the communication interface (23) has received the digital series signals of the external card reader. In the mean time, the external card reader also supplies direct current for internal usage through the contact-type interface.

The working flow chart of the IC card with display panel but without batteries of the invention is as follows:

The microprocessor (24), after receiving the signals from the communication interface (23), can store data in an EEPROM (28). The microprocessor (24) can also convert the data into the driving signals of the display panel (21) through the display driver (25) for the users to look up. The microprocessor (24) can also transmit the response signals to the antenna for the external card reader through the communication interface (23).

The charge-pump (26) converts the current source generated by the rectifier/voltage regulator (27) into a relatively higher voltage for the display driver (25) to convert into driving signals of the display panel (21).

In this way, the communication interface (23), after receiving the external data, can firstly decrypt and decode the data and display them on the display panel (21) for users to look up the data and their content. Since the display panel (21) employed by the invention is the one with bistable function having the characteristic that once the data are displayed, no persistent power supply for the display panel (21) is needed, thereby, the displayed data will be preserved persistently. In other word, not until the next time when the display panel (21) is driven again, and the displayed content or the updated data are changed, the data displayed on it will not disappear.

Moreover, the IC of the above-mentioned contactless type RF IC card (RFIC) (31) and the Contact Smart IC (32) are the Smart ICs that circulate in the market. The invention can easily make the market-circulated Smart IC (contact-type, contactless type, or dual interface type IC) upgrade their level to become display-type IC cards without batteries by adding elements such that their commands and ways of adding confidential means are compatible to those market-circulated Smart IC. However, these kinds of Smart ICs are an option in the invention, and the invention can employ the commands and ways of adding confidential means, as well as card reader communication defined by the invention to cut the sale cost whenever there are no Smart ICs available in the market.

By making use of both of the above-mentioned two ways of power supply, the IC card of the invention can all provide the display and read functions. Besides being able to exempt using batteries that can avoid being disturbed by the service life of the batteries, the invention can increase yield since the time for fabricating process is shorten. Consequently, the invention can decrease the labor and facility cost. Moreover, because the cost of materials can be obviously lowered, the advantage of competitiveness in the market is increased, thereby, the invention is profound in industrial utility.

It will become apparent for those skilled in the art that various modifications and variations can be made to the structure of the invention without departing from the scope or spirit of the invention. In view of the foregoing, it is intended that all the modification and variation fall within the scope of the following appended claims and their equivalents.

What is claimed is:

1. An IC card with a display panel but without batteries includes a communication interface connected to a signal-receiving element, a microprocessor, an EEPROM, a rectifier/voltage regulator, a display driver, a charge-pump disposed therein, and a display panel disposed thereon;

wherein the microprocessor, after receiving the signals from the communication interface through said signal-receiving element, stores data in an EEPROM, wherein the communication interface also supplied power received through said signal-receiving element and communication interface to said rectifier/voltage regulator, causing the rectifier/voltage regulator to generate a current, and wherein the charge-pump converts the current generated by the rectifier/voltage regulator into a relatively higher voltage for the display driver to convert into driving signals of the display panel; and wherein the communication interface, after receiving the external data, firstly decrypts and decodes the data, then reads the data through the microprocessor and displays the data on the display panel.

2. The IC card with display panel but without batteries of claim 1, wherein the display panel has bistable functions so that said display panel maintains said display after power is no longer being supplied through the commuunication interface.

3. The IC card with display panel but without batteries of claim 1, wherein the communication interface is a contact communication interface, and said signal-receiving element is an electrical contact.

4. The IC card with display panel but without batteries of claim 1, wherein the communication interface is a contact-less type RF interface, and said signal-receiving element is an antenna.

5. The IC card with display panel but without batteries of claim 1, wherein an internally required driving power source is a direct current source supplied through the contact-type interface via a communication interface.

6. The IC card with display panel but without batteries of claim 1, wherein an internally required driving power source is the power source supplied via the communication interface after rectification.

7. The IC card with display panel but without batteries of claim 1, wherein an antenna is provided inside the IC card, and by making use of the antenna, the RF signals and coupling signals received from an external card reader perform RF decryption through a communication interface; and wherein, the coupling signal generates direct current to supply an internally required voltage through a rectifier/voltage regulator.

8. The IC card with display panel but without batteries of claim 7, wherein the microprocessor also transmits response signals to the antenna for the external card reader through the communication interface.

* * * * *